US006417586B1

(12) United States Patent
Jarczynski et al.

(10) Patent No.: US 6,417,586 B1
(45) Date of Patent: Jul. 9, 2002

(54) GAS COOLED ENDWINDINGS FOR DYNAMOELECTRIC MACHINE ROTOR AND ENDWINDING COOL METHOD

(75) Inventors: Emil Donald Jarczynski, Scotia; Todd Garrett Wetzel, Niskayuna; Christian Lee Vandervort, Voorheesville; Samir Armando Salamah, Niskayuna; Wayne Nigel Owen Turnbull, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/739,361

(22) Filed: Dec. 19, 2000

(51) Int. Cl.[7] ................................. H02K 3/24
(52) U.S. Cl. ................... 310/61; 310/270; 310/58; 310/59
(58) Field of Search ..................... 310/270, 52, 58, 310/59, 60 A, 60 R, 64, 65, 61

(56) References Cited

U.S. PATENT DOCUMENTS

| 2,425,997 | A |   | 8/1947  | Criner et al. ............ 171/252 |
|-----------|---|---|---------|-----------------------------------|
| 2,778,959 | A | * | 1/1957  | Kilner .................... 310/64 |
| 2,786,951 | A |   | 3/1957  | Morgan .................... 310/61 |
| 2,833,944 | A |   | 5/1958  | Willyoung ................. 310/61 |
| 2,844,746 | A | * | 7/1958  | Coggeshall ................ 310/64 |
| 2,904,708 | A | * | 9/1959  | Willyoung ................. 310/64 |
| 3,225,231 | A |   | 12/1965 | Kudlacik .................. 310/64 |
| 4,335,324 | A |   | 6/1982  | Fujioka et al. ............ 310/61 |
| 4,546,279 | A |   | 10/1985 | Hammer et al. ............. 310/59 |
| 4,709,177 | A |   | 11/1987 | Kaminski .................. 310/59 |
| 5,252,880 | A |   | 10/1993 | Kazmierczak et al. ....... 310/270 |
| 5,644,179 | A |   | 7/1997  | Staub et al. .............. 310/65 |
| 6,204,580 | B1| * | 3/2001  | Kazmierczak ............... 310/52 |
| 6,252,318 | B1| * | 6/2001  | Kazmierczak ............... 310/61 |
| 6,339,268 | B1| * | 1/2002  | Kaminski et al. ........... 310/61 |

FOREIGN PATENT DOCUMENTS

JP       2000-350412    * 12/2000    ............ H02K/9/04

OTHER PUBLICATIONS

U.S. application Ser. No. 09/739,360 filed Dec. 19, 2000.
U.S. application Ser. No. 09/739,359 filed Dec. 19, 2000.
U.S. application Ser. No. 09/739,358 filed Dec. 19, 2000.

* cited by examiner

Primary Examiner—Burton S. Mullins
(74) Attorney, Agent, or Firm—Nixon & Vanderhye PC

(57) ABSTRACT

A gas cooled dynamoelectric machine is provided that includes a rotor having a body portion, axially extending coils, endwindings, and a plurality of spaceblocks disposed between the endwindings, so that a plurality of cavities are defined between mutually adjacent endwindings and spaceblocks. To cool the endwindings, at least one of the spaceblocks has a radially-extending duct with an outlet opening disposed to direct cooling gas flowing therethrough generally in the direction of the central region of the adjacent cavity.

19 Claims, 6 Drawing Sheets

GAS COOLED ENDWINDINGS FOR DYNAMOELECTRIC MACHINE ROTOR AND ENDWINDING COOL METHOD

BACKGROUND OF THE INVENTION

The present invention relates to a structure and method for enhanced cooling of generator rotors by directing multiple streams of cooling gas into cavity spaces between rotor end coils for creating multiple interacting circulation cells and directed flow jets.

The power output rating of dynamoelectric machines, such as large turbo-generators, is often limited by the ability to provide additional current through the rotor field winding because of temperature limitations imposed on the electrical conductor insulation. Therefore, effective cooling of the rotor winding contributes directly to the output capability of the machine. This is especially true of the rotor end region, where direct, forced cooling is difficult and expensive due to the typical construction of these machines. As prevailing market trends require higher efficiency and higher reliability in lower cost, higher-power density generators, cooling the rotor end region becomes a limiting factor.

Turbo-generator rotors typically consist of concentric rectangular coils mounted in slots in a rotor. The end portions of the coils (commonly referred to as endwindings), which are beyond the support of the main rotor body, are typically supported against rotational forces by a retaining ring (see FIG. 1). Support blocks are placed intermittently between the concentric coil endwindings to maintain relative position and to add mechanical stability for axial loads, such as thermal loads (see FIG. 2). Additionally, the copper coils are constrained radially by the retaining ring on their outer radius, which counteracts centrifugal forces. The presence of the spaceblocks and retaining ring results in a number of coolant regions exposed to the copper coils. The primary coolant path is axial, between the spindle and the bottom of the endwindings. Also, discrete cavities are formed between coils by the bounding surfaces of the coils, blocks and the inner surface of the retaining ring structure. The endwindings are exposed to coolant that is driven by rotational forces from radially below the endwindings into these cavities (see FIG. 3). This heat transfer tends to be low. This is because according to computed flow pathlines in a single rotating end winding cavity from a computational fluid dynamic analysis, the coolant flow enters the cavity, traverses through a primary circulation and exits the cavity. Typically, the circulation results in low heat transfer coefficients especially near the center of the cavity. Thus, while this is a means for heat removal in the endwindings, it is relatively inefficient.

Various schemes have been used to route additional cooling gas through the rotor end region. All of these cooling schemes rely on either (1) making cooling passages directly in the copper conductors by machining grooves or forming channels in the conductors, and then pumping the gas to some other region of the machine, and/or (2) creating regions of relatively higher and lower pressures with the addition of baffles, flow channels and pumping elements to force the cooling gas to pass over the conductor surfaces.

Some systems penetrate the highly stressed rotor retaining ring with radial holes to allow cooling gas to be pumped directly alongside the rotor endwindings and discharged into the air gap, although such systems can have only limited usefulness due to the high mechanical stress and fatigue life considerations relating to the retaining ring.

If the conventional forced rotor end cooling schemes are used, considerable complexity and cost are added to rotor construction. For example, directly cooled conductors must be machined or fabricated to form the cooling passages. In addition, an exit manifold must be provided to discharge the gas somewhere in the rotor. The forced cooling schemes require the rotor end region to be divided into separate pressure zones, with the addition of numerous baffles, flow channels and pumping elements which again add complexity and cost.

If none of these forced or direct cooling schemes are used, then the rotor endwindings are cooled passively. Passive cooling relies on the centrifugal and rotational forces of the rotor to circulate gas in the blind, dead-end cavities formed between concentric rotor windings. Passive cooling of rotor endwindings is sometimes also called "free convection" cooling.

Passive cooling provides the advantage of minimum complexity and cost, although heat removal capability is diminished when compared with the active systems of direct and forced cooling. Any cooling gas entering the cavities between concentric rotor windings must exit through the same opening since these cavities are otherwise enclosed— the four "side walls" of a typical cavity are formed by the concentric conductors and the insulating blocks that separate them, with the "bottom" (radially outward) wall formed by the retaining ring that supports the endwindings against rotation. Cooling gas enters from the annular space between the conductors and the rotor spindle. Heat removal is thus limited by the low circulation velocity of the gas in the cavity and the limited amount of the gas that can enter and leave these spaces.

In typical configurations, the cooling gas in the end region has not yet been fully accelerated to rotor speed, that is, the cooling gas is rotating at part rotor speed. As the fluid is driven into a cavity by means of the relative velocity impact between the rotor and the fluid, the heat transfer coefficient is typically highest near the spaceblock that is downstream relative to the flow direction—where the fluid enters with high momentum and where the fluid coolant is coldest. The heat transfer coefficient is also typically high around the cavity periphery. The center of the cavity receives the least cooling.

Increasing the heat removal capability of passive cooling systems will increase the current carrying capability of the rotor providing increased rating capability of the generator whole maintaining the advantage of low cost, simple and reliable construction.

U.S. Pat. No. 5,644,179, the disclosure of which is incorporated by reference describes a method for augmenting heat transfer by increasing the flow velocity of the large single flow circulation cell by introducing additional cooling flow directly into, and in the same direction as, the naturally occurring flow cell. This is shown in FIGS. 4 and 5. While this method increases the heat transfer in the cavity by augmenting the strength of the circulation cell, the center region of the rotor cavity was still left with low velocity and therefore low heat transfer. The same low heat transfer still persists in the corner regions.

SUMMARY OF THE INVENTION

The invention described herein overcomes the difficulties inherent in a single large circulation cell for increasing heat transfer. Rather than injecting cooling flow in the direction of the single circulation cell to augment it, as described in U.S. Pat. No. 5,644,179, the invention describes several methods for creating multiple circulation cells that penetrate the center region of the cavity, thereby significantly increasing the heat transfer in a region that would otherwise be devoid of cooling flow. The same benefit extends to the corner regions of the cavity as well.

Thus, the endwinding assembly and method of the invention substantially increase the heat transfer performance in all regions of the rotor endwinding cavity by creating multiple circulating cells and cooling jets. By eliminating dead zones in the rotor cooling activities, the overall cooling effectiveness is significantly increased, thereby increasing the power rating of the machine. The system is low cost, easily installed and robust, thereby providing a practical solution to a complex problem, contributing to the marketability of the power generator.

Accordingly, the invention is embodied in a gas cooled dynamoelectric machine, comprising a rotor having a body portion, the rotor having axially extending coils and endwindings extending axially beyond at least one end of the body portion; at least one spaceblock located between first and second endwindings, the spaceblock having a radially-extending duct disposed therein that extends between an inlet opening and an outlet opening; and wherein the duct outlet opening is disposed in a circumferential surface of the spaceblock in a mid-section of the spaceblock so as to emit the cooling gas flow generally in a direction of a central region of a cavity defined adjacent thereto.

The invention is further embodied in a method of cooling a dynamoelectric machine comprising a rotor having a body portion, axially extending coils and endwindings extending axially beyond at least one end of the body portion, and at least one spaceblock located between first and second endwindings. The method comprises directing cooling gas radially through a radially-extending duct in the at least one spaceblock and then generally circumferentially into a cooling cavity circumferentially adjacent the spaceblock, generally in the direction of a central portion of the cooling cavity.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
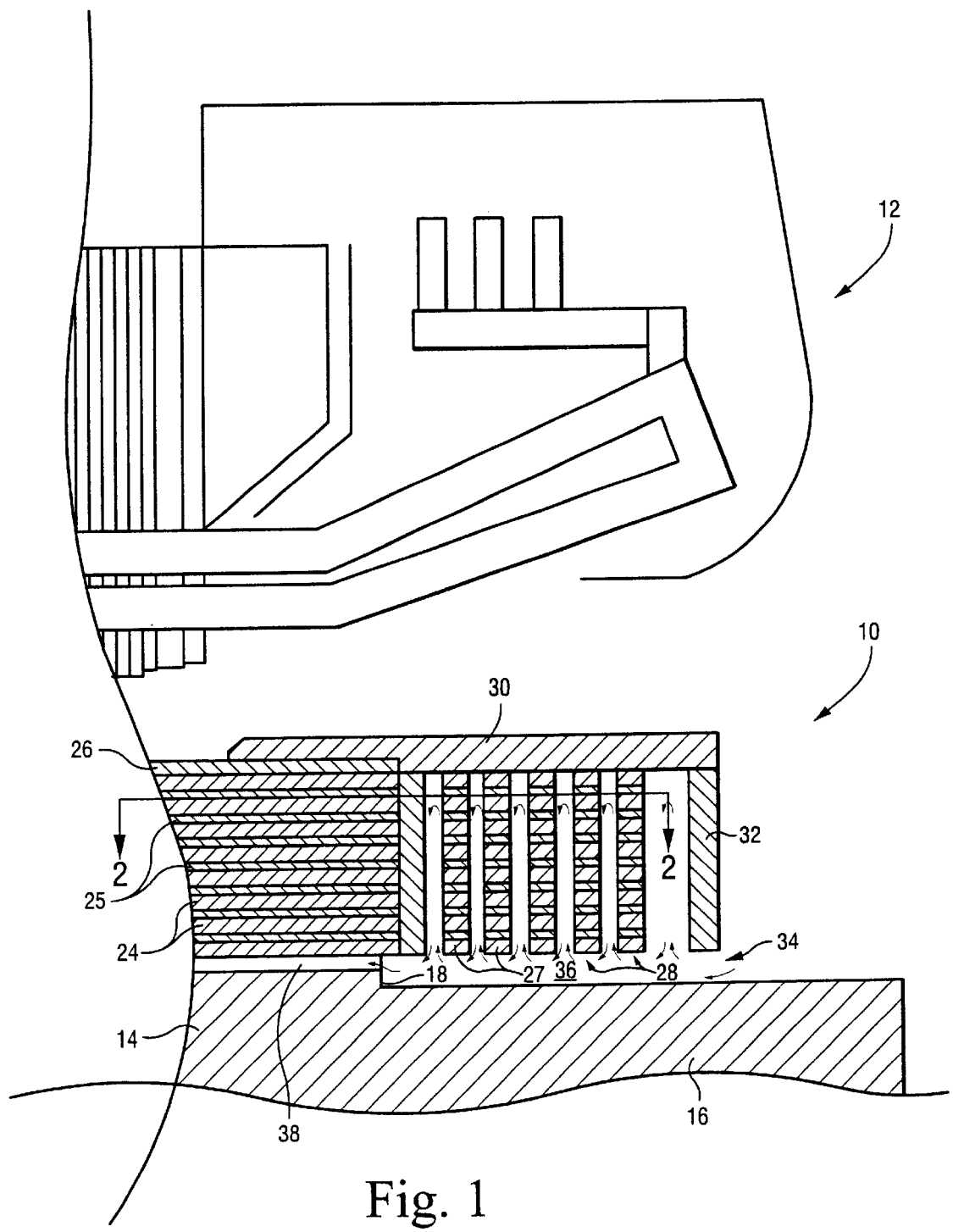
FIG. 1 is a cross-sectional view of a portion of the end turn region of a dynamoelectric machine rotor with stator in opposed facing relation thereto.
Figure 2:
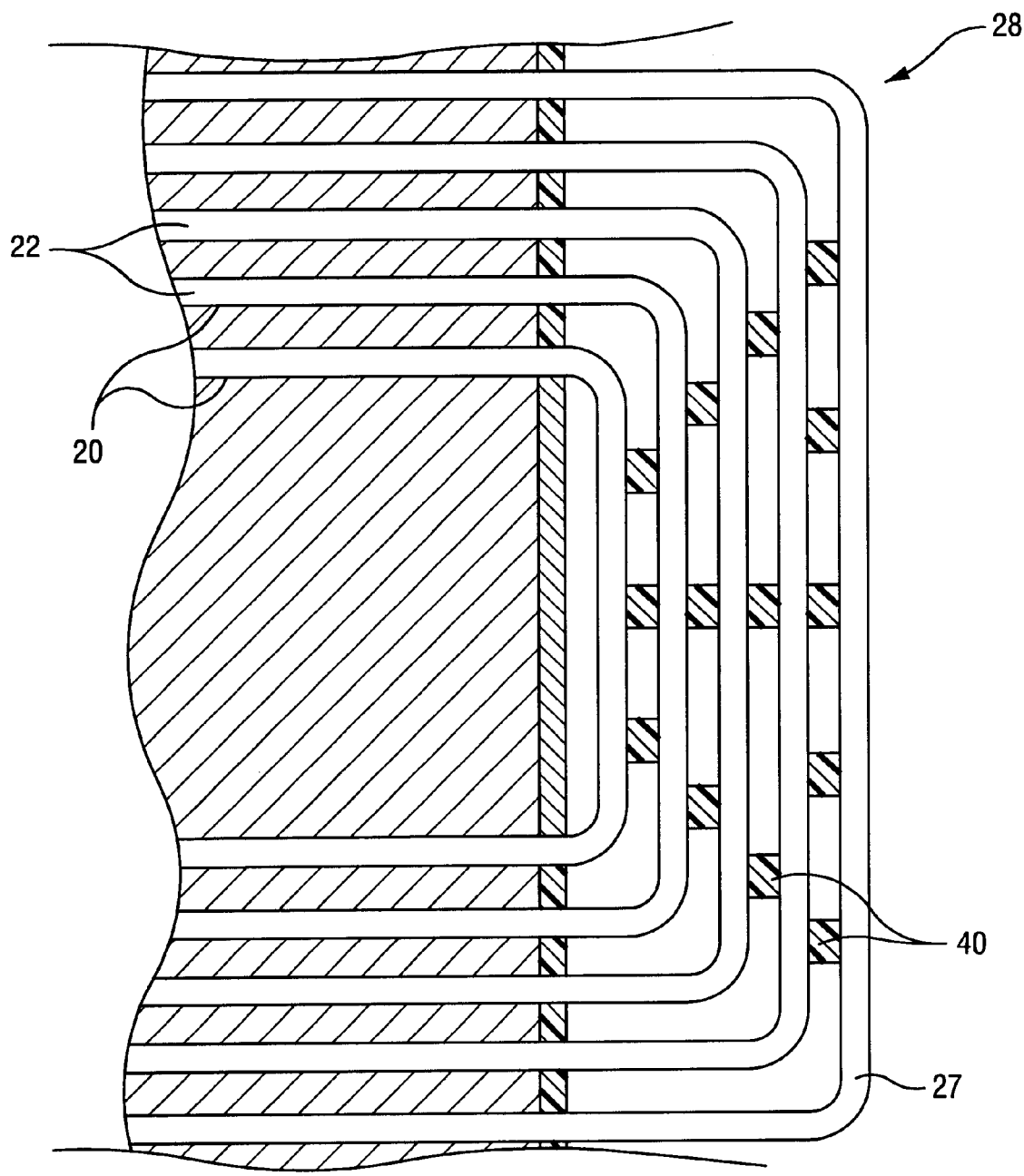
FIG. 2 is a cross-sectional top view of the dynamoelectric machine rotor taken along line 2—2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The rotor includes a generally cylindrical body portion 14 centrally disposed on a rotor spindle 16 and having axially opposing end faces, of which a portion 18 of one end face is shown in FIG. 1. The body portion is provided with a plurality of circumferentially-spaced, axially extending slots 20 for receiving concentrically arranged coils 22, which make up the rotor winding. For clarity, only five rotor coils are shown, although several more are commonly used in practice.

Specifically, a number of conductor bars 24 constituting a portion of the rotor winding are stacked in each one of the slots. Adjacent conductor bars are separated by layers of electrical insulation 25. The stacked conductor bars are typically maintained in the slots by wedge 26 (FIG. 1) and are made of a conductive material such as copper. The conductor bars 24 are interconnected at each opposing end of the body portion by end turns 27, which extend axially beyond the end faces to form stacked endwindings 28. The end turns are also separated by layers of electrical insulation.

Referring specifically to FIG. 1, a retaining ring 30 is disposed around the end turns at each end of the body portion to hold the endwindings in place against centrifugal forces. The retaining ring is fixed at one end to the body portion and extends out over the rotor spindle 16. A centering ring 32 is attached to the distal end of the retaining ring 30. It should be noted that the retaining ring 30 and the center ring 32 can be mounted in other ways, as is known in the art. The inner diameter of the centering ring 32 is radially spaced from the rotor spindle 16 so as to form a gas inlet passage 34 and the endwindings 28 are spaced from the spindle 16 so as to define an annular region 36. A number of axial cooling channels 38 formed along slots 20 are provided in fluid communication with the gas inlet passage 34 via the annular region 36 to deliver cooling gas to the coils 22.

Turning to FIG. 2, the endwindings 28 at each end of the rotor 10 are circumferentially and axially separated by a number of spacers or spaceblocks 40. (For clarity of illustration, the spaceblocks are not shown in FIG. 1). The spaceblocks are elongated blocks of an insulating material located in the spaces between adjacent endwindings 28 and extend beyond the full radial depth of the endwindings into the annular gap 36. Accordingly, the spaces between the concentric stacks of the end turns (hereinafter endwindings) are divided into cavities. These cavities are bounded on the top by the retaining ring 30 and on four sides by adjacent endwindings 28 and adjacent spaceblocks 40. As best seen in FIG. 1, each of these cavities is in fluid communication with the gas inlet passage 34 via the annular region 36. A portion of the cooling gas entering the annular region 36 between the endwinding 28 and the rotor spindle 16 through the gas inlet passage 34 thus enters the cavities 42, circulates therein, and then returns to the annular region 36 between the endwinding and the rotor spindle. Air flow is shown by the arrows in FIGS. 1 and 3.

Figure 3:
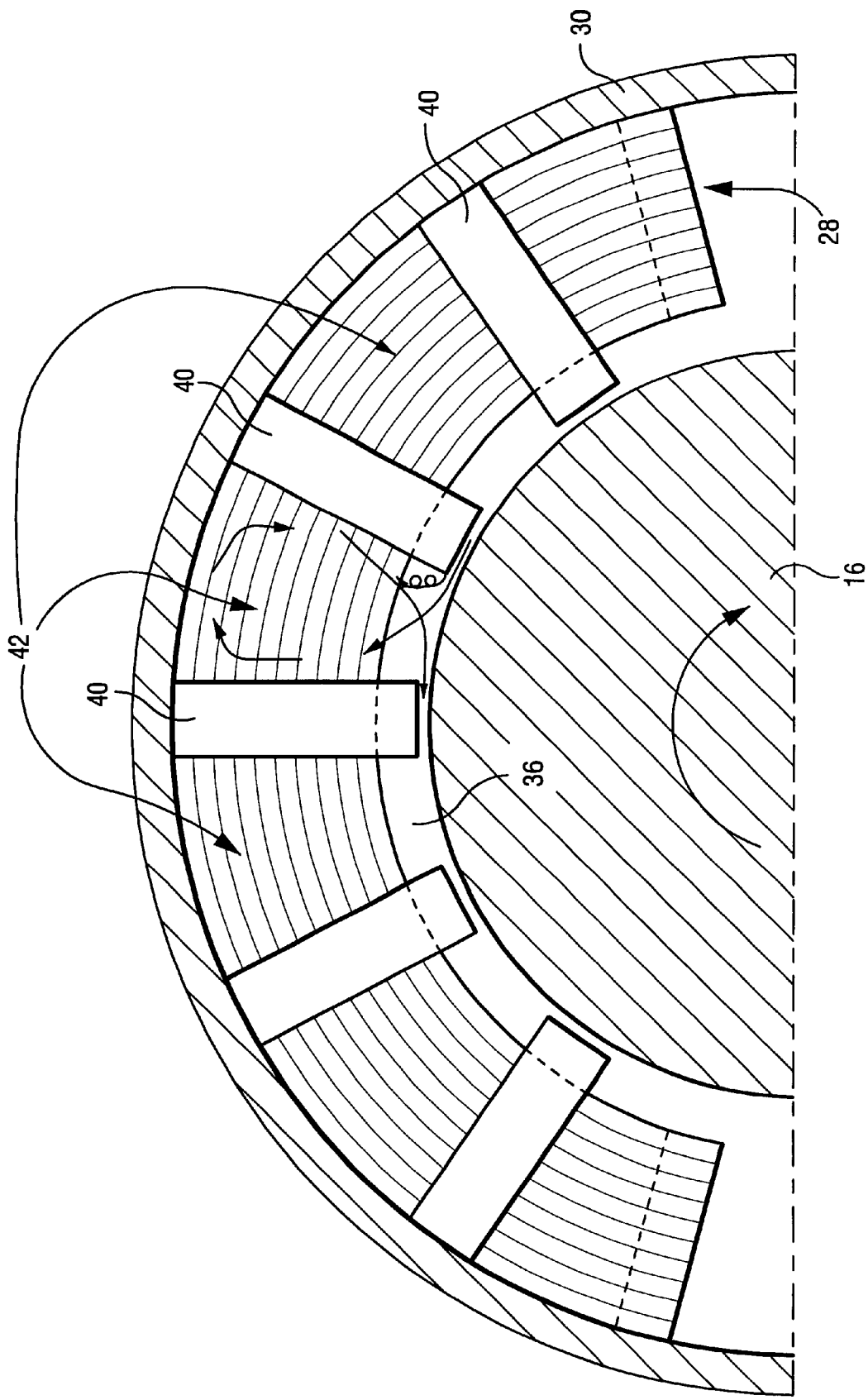
FIG. 3 is a schematic illustration showing passive gas flow into and through endwinding cavities.
Figure 4:
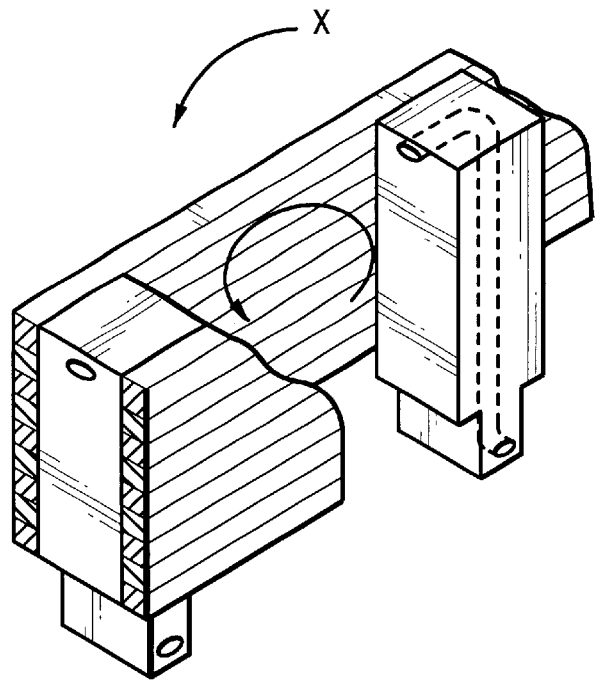
FIG. 4 is a perspective view, partly broken-away of a portion of the rotor end turn region in accordance with a first embodiment of the invention disclosed in U.S. Pat. No. 5,644,179.
Figure 5:
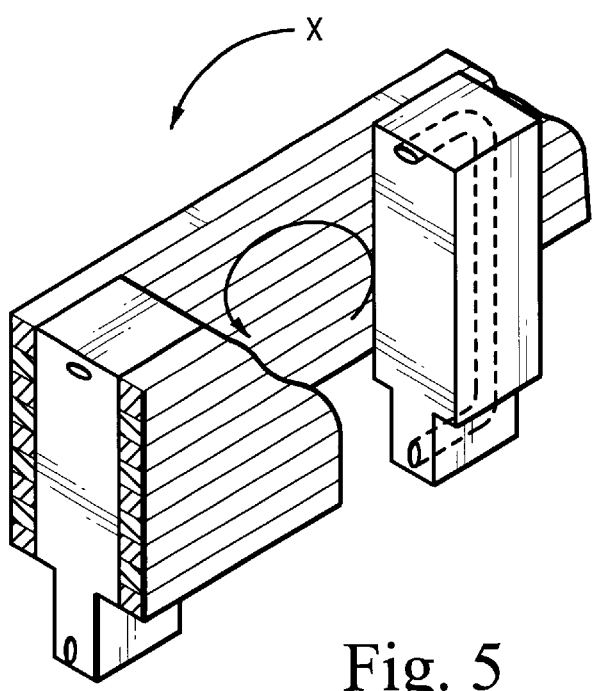
FIG. 5 is a perspective view, partly broken away, of a portion of the rotor end turn region showing a second embodiment of the invention of U.S. Pat. No. 5,644,179.

The inherent pumping action and rotational forces acting in a rotating generator cavity produce a large single flow circulation cell, as schematically shown in FIG. 3. This flow circulation cell exhibits its highest velocity near the peripheral edges of the cavity, leaving the center region inadequately cooled due to the inherently low velocity in the center region of the cavity. As can be seen from FIG. 3, large areas of the corner regions are also inadequately cooled because the circular motion of the flow cell does not carry cooling flow into the corners.

Figure 6:
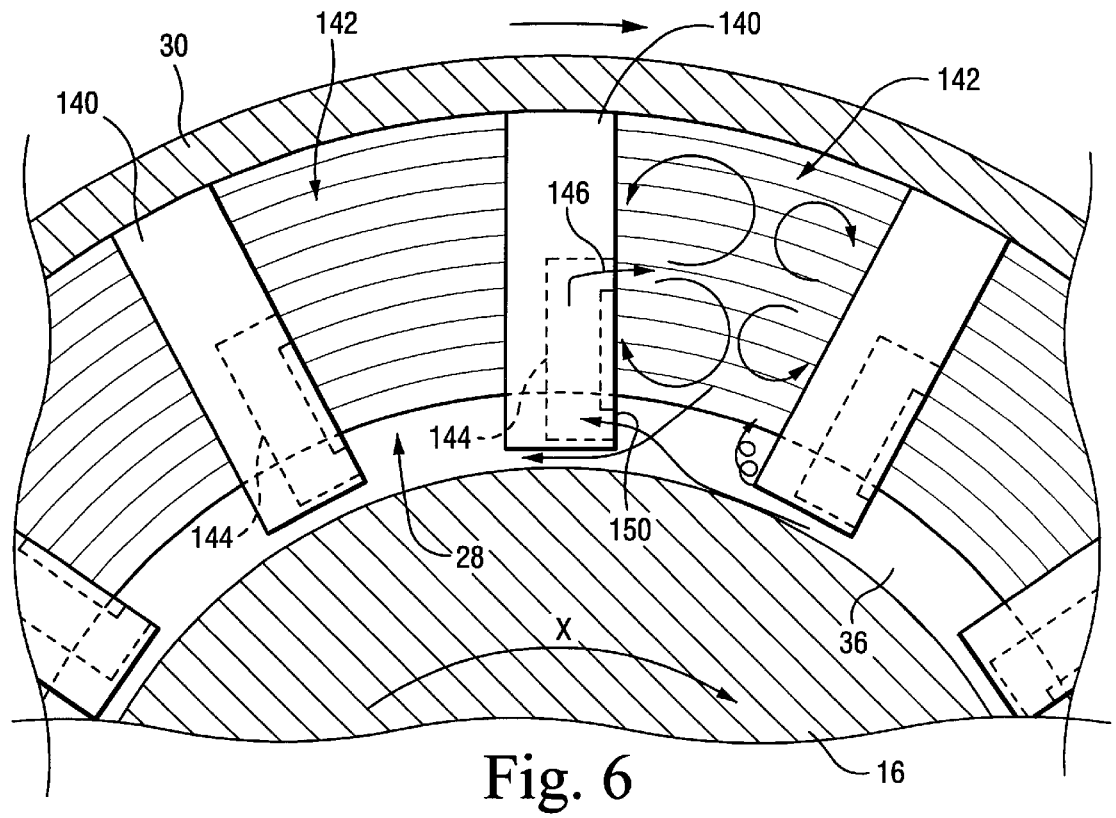
FIG. 6 is a partial, cross-sectional view illustrating an assembly and method for creating multiple circulation cells in an embodiment of the invention.

Referring now to FIG. 6, there is illustrated a partial section of the rotor endwinding embodying the invention, showing cavities 142 and with the direction of rotation indicated by arrow X. In the embodiment illustrated in FIG. 6, each spaceblock 140 is provided with an internal cooling gas duct 144 that in this embodiment has a discharge port or outlet opening 146 in the block at the center region of the respective cavity 142 so that the coolant flow creates a counter rotating pair of circular cells in the cavity thus providing for increased heat transfer in all regions of the cavity, including both the center and corner regions which have typically been deprived of coolant flow.

Each cooling duct 144 lies along the length of the spaceblock 140 and is thus oriented radially with respect to the rotor axis. The duct extends from a point radially inwardly of or below the endwindings 28 to a point generally centrally of the radial height of the endwinding and thus provides a passage through which cooling gas can flow from the annular region 36 between the endwindings 28 and the rotor spindle 16 into the cavities 142. Specifically, each duct 144 extends from an inlet opening 150 located near the radially inward end of the spaceblock 140 to an outlet opening 146 located about midway along the length of the spaceblock. The inlet opening 150 is disposed on a circumferentially-oriented upstream surface of the spaceblock for receiving the cooling flow. As seen in FIG. 6, in this exemplary embodiment, the inlet opening is located on the portion of the spaceblock that extends below the endwinding 28 so as to be fluid communication with the annular region 36 between the endwinding 28 and the rotor spindle 16. The outlet opening 146 is also disposed on a circumferentially oriented surface of the spaceblock and is fluid communication with one of the cavities 142 bounded by the spaceblock.

The coolant flow is driven radially through the block by impact pressure, resulting from the relative velocity of the gas entering the rotor end region, and the centrifugal pumping of the rotor. As noted above, the coolant flow is directed through discharge port(s) 150 in the spaceblock(s) into the center region of the adjacent cavity(s). This directed jet of coolant creates a counter-rotating pair of circulating cells in the cavity. This pair of cells then drives additional circulation cells, providing increased heat transfer in all regions of the cavity, including the center region and the cavity corners that would otherwise be deprived of coolant flow. The main coolant jet adds to the heat transfer performance and exits from the rotating cavity as shown.

In operation, rotor rotation will cause cooling gas to be drawn through the gas inlet passage 34 (FIG. 1) into the annular region 36 between the endwinding and the rotor spindle (FIG. 6). The cooling gas is driven through inlet openings 150 into duct 144. The cooling gas in duct 144 is expelled into the corresponding cavity from the respective outlet opening 146. The outlet opening is located at about a radial mid-point of the cavity so that the coolant flow is directed from the duct 144 in the block into the center region of the cavity 142. This creates multiple circulation cells instead of just one large one, providing enhanced heat transfer in the center of the cavity and all other regions of the cavity. The generation of multiple circulating cells facilitates heat removal from all parts of the cavity including the central region and corner regions that the prior art single circulating cell tended to bypass.

Figure 7:
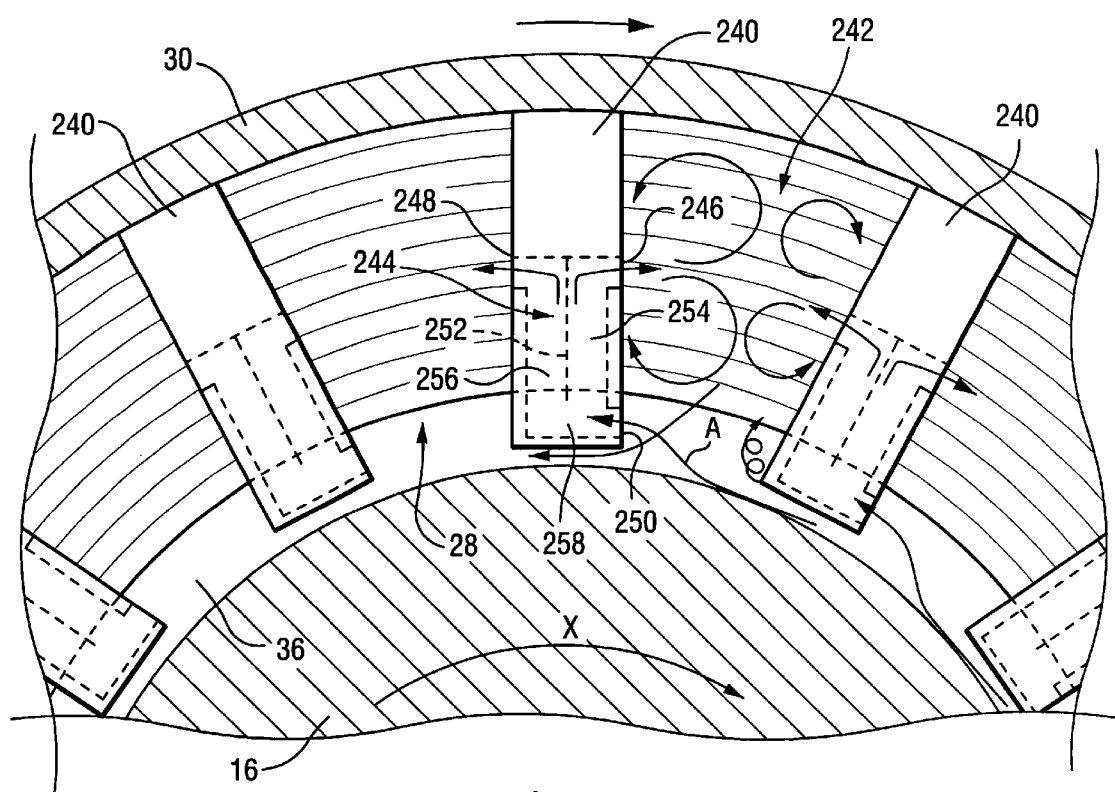
FIG. 7 is a partial, cross-sectional view showing an alternate assembly and method for creating multiple circulation cells for enhancing heat transfer.

FIG. 7 shows another embodiment of the invention where the support blocks discharge cooling jets to enter each cavity from opposite directions, thereby strengthening the counter-rotating cells and providing even more through flow. More specifically, FIG. 7 shows a partial section of the rotor endwinding showing cavities 242 with the direction of rotation indicated by arrow X. In this embodiment, each spaceblock 240 is provided with an internal cooling gas duct 244 for creating multiple circulating cells inside the cavity to increase heat removal. Like the ducts of the first embodiment, each cooling gas duct 244 is oriented radially with respect to the rotor and extends from a point radially inwardly of or below the endwinding 28 to a point near the central region of the spaceblock. The ducts thus provide passages to which cooling gas can flow from the annular region 36 between the endwinding 28 and the rotor spindle 16 into the central region of the cavities 242. Specifically, each duct 244 extends from an inlet opening 250 located near the radially inward end of the spaceblock to first and second outlet openings 246, 248 located near the central region of the spaceblock 240 and the respective cavity. The inlet opening is disposed on a circumferentially oriented surface of the spaceblock for receiving coolant flow as indicated by arrow A. As seen in FIG. 7, the inlet opening 250 is located on the portion of the spaceblock that extends below the endwinding 28 so as to be fluid communication with the annular region 36 between the endwinding 28 and the rotor spindle 16. As noted above, in this embodiment, first and second outlet openings 246,248 are provided, one disposed on each circumferentially oriented surface of the spaceblock 240 so as to be in fluid communication with respective cavities 242 that are bounded by the spaceblock. In the illustrated embodiment, further, a partition 252 is provided in the radial duct 244 to define first and second radial duct passage portions 254,256 that are circumferentially adjacent in the spaceblock. If deemed necessary or desirable, the partition may extend into the circumferential portion of the passage indicated by reference 258 so that coolant flow is suitably deflected in generally equal amounts to the respective passage portions 254,256 for flow out of the respective outlet openings 246,248. The coolant flow is directed from the ducted block 240 to the center region of each cavity 242 from both circumferential sides of the cavity. This creates stronger multiple circulation cells, providing enhanced heat transfer in the center of the cavity and all other regions of the cavity. Here again, the coolant flow enters the ducted block driven by impact pressure and centrifugal pumping.

Figure 8:
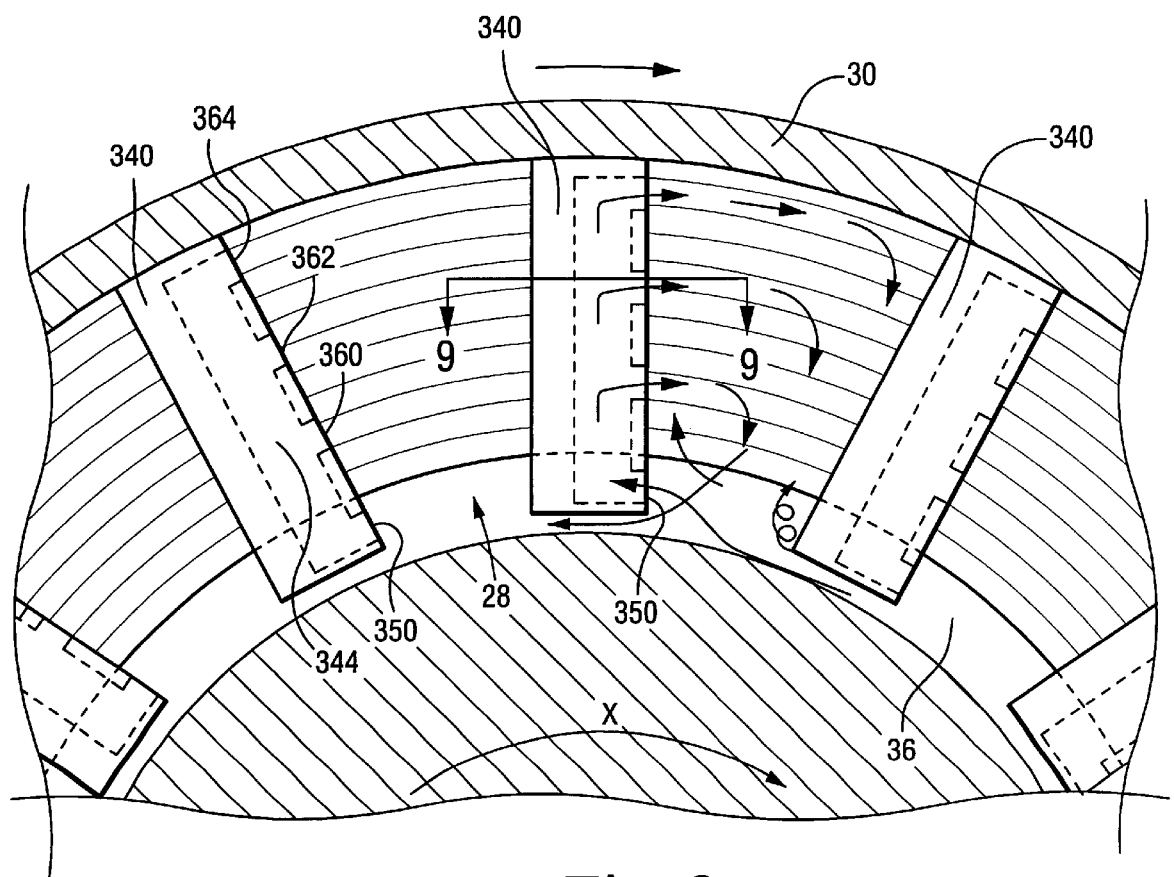
FIG. 8 is a partial cross-sectional view showing a further alternate embodiment of the invention for creating multiple cooling flow streams for enhanced heat transfer.

FIG. 8 shows an embodiment of the invention where multiple discharge ports provide coolant flow to all regions of the cavity, again increasing heat transfer by overcoming the inherent heat transfer difficulties resulting from the naturally occurring single large circulation cell in the rotating cavity.

More particularly, FIG. 8 shows a partial section of the rotor endwinding showing circumferentially adjacent cavities 342, with a direction of rotation indicated by arrow X. In accordance with this embodiment, each spaceblock 340 is provided with an internal cooling duct 344 for directing cooling flow to generally all regions of the cavity for enhanced heat transfer. Like the ducts of the first and second embodiments, each cooling gas duct is oriented radially with respect to the rotor and extends from an inlet opening 350 disposed radially inwardly of or below the endwinding 28. Unlike the prior embodiments, however, the cooling gas duct extends to a point near the retaining ring 30 and a plurality of outlets 360, 362, 364 are defined at spaced locations along the length of the cooling gas duct. Specifically, each duct extends from an inlet opening 350 located near the radially inward end of the spaceblock to a plurality of outlet openings including a first outlet opening 360 disposed approximately one third of the length along the spaceblock 340, a second outlet opening 362 disposed approximately two thirds of the length along the outlet, and a third outlet opening 364 disposed adjacent the retaining ring 30. By directing the coolant flow through the multiple exhaust holes, multiple cooling flow streams are generated instead of one large circulating cell as with the prior art, to thereby provide more uniform heat transfer in all regions including the center region which would otherwise be starved of coolant flow.

It should also be noted that whereas three exhaust holes are illustrated in the embodiment of FIG. 8, according to this embodiment at least two such exhaust holes are provided and thus more or fewer than the three exhaust holes shown could be provided. As yet a further alternative, similar to the second embodiment illustrated in FIG. 7, a plurality of exhaust holes may be defined to extend from the cooling duct in each circumferential direction of the spaceblock to direct flow into each of the respective cavities bounded by the spaceblock, to further ensure full distribution of the cooling flow through the cavity.

Figure 9:
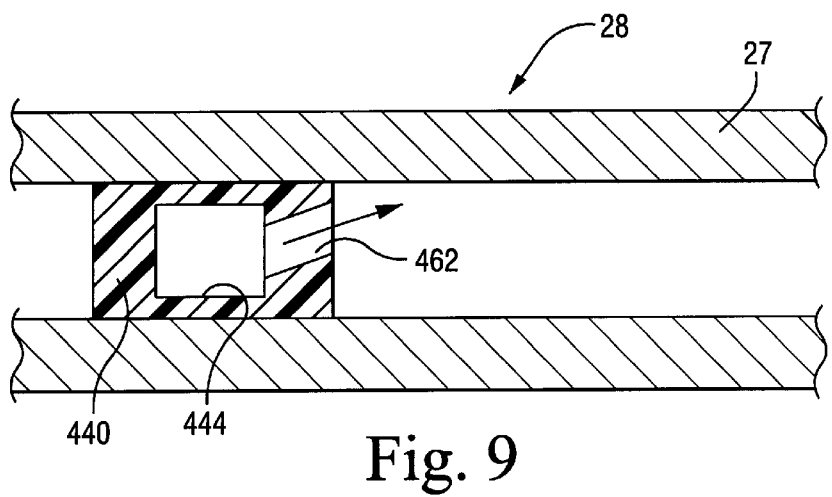
FIG. 9 is a view taken along line 9—9 of FIG. 8 showing yet a further alternative embodiment of the invention.

In the embodiment of FIG. 8, the exhaust holes or outlet opening 360, 362, 364 direct the coolant flow generally circumferentially and are thus disposed in a plane disposed at an angle of about 90 degrees with respect to the axis of the rotor. The cross-sectional view shown in FIG. 9 represents an alternate form of the embodiment of FIG. 8. FIG. 9 shows a variation and improvement on the multiple cooling jets from FIG. 8 by directing the jets such that they impinge directly on the heated walls of the rotating cavity, thereby increasing heat transfer even more.

Thus, this embodiment generally corresponds to the embodiment of FIG. 8 except that exhaust passage(s) 462 (only one of which is shown on FIG. 9) for passage 444 in the spaceblock 440 inclined so as to be defined in a plane that is disposed at an angle of <90° with respect to the axis of the rotor, to aim the cooling jet to impinge directly on the endwinding 28 thus increasing heat transfer. The exhaust passages may direct cooling gas to either of the axially adjacent rotor endwindings, or one or more of the exhaust passages can direct the cooling jet towards one axially adjacent rotor endwinding and one or more others of the exhaust holes can direct their respective cooling jet towards the other of the two rotor endwinding bounding the cavity. In the alternative, circumferentially adjacent spaceblocks can direct the cooling jets to respectively alternating rotor endwindings. Other permutations and combinations of the cooling jet directed flow could be adopted, as will be evident from a consideration of the foregoing.

As can be seen in FIG. 2, the cavities between endwindings comprise circumferentially oriented or "endstrap" cavities and axial coil side cavities. It should be noted that while endstrap cavities are shown in FIGS. 6–8, the present invention is equally applicable to the axial coil side cavities. The primary difference between such cavities is that the axial coil side cavities are oriented transverse to the direction of rotation, instead of being oriented along the direction of rotation as the endstrap cavities are. This means that the relationship of the axial velocity component and circumferential velocity component to the cavity would be reversed such that the circumferentially velocity component would be perpendicular to the cavity and the axial velocity component would be parallel to the cavities. Thus, in such an orientation, the inlet opening and outlet opening would be oriented 90° relative to each other so that the inlet faces the circumferential direction and the outlet faces axially.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A gas cooled dynamoelectric machine, comprising:
   a rotor having a body portion, said rotor having axially extending coils and endwindings extending axially beyond at least one end of said body portion;
   a plurality of spaceblocks disposed between said endwindings;
   a plurality of cavities being defined between mutually adjacent endwindings and spaceblocks;
   at least one said spaceblock having a radially-extending duct defined therein, said duct extending between an inlet opening and an outlet opening; and
   wherein said outlet opening is disposed in a surface of said at least one spaceblock facing a cavity adjacent thereto, said outlet opening being defined in a mid-section of said spaceblock so as to emit said cooling gas flow generally in a direction of a central region of said cavity, wherein said inlet opening is formed on a circumferentially oriented surface of said at least one spaceblock.

2. The dynamoelectric machine of claim 1, wherein said inlet opening is located adjacent a radially inward end of said at least one spaceblock.

3. The dynamoelectric machine of claim 1, wherein said outlet opening is formed on a circumferentially oriented surface of said at least one spaceblock.

4. The dynamoelectric machine of claim 1, wherein a plurality of said spaceblocks have a radially-extending duct formed therein.

5. The dynamoelectric machine of claim 1, wherein there are a plurality of outlet openings, at least one said outlet opening emitting said cooling gas flow generally in a direction of a central region of said cavity.

6. The dynamoelectric machine of claim 5, wherein said outlet openings are defined in a common surface of said at least one spaceblock.

7. The dynamoelectric machine of claim 5, wherein said outlet openings are defined in at least first and second surfaces of said at least one spaceblock.

8. A gas cooled dynamoelectric machine comprising:
   a rotor having a body portion, said rotor having axially extending coils and endwindings extending axially beyond at least one end of said body portion;
   a plurality of spaceblocks disposed between said endwindings;
   a plurality of cavities being defined between mutually adjacent endwindings and spaceblocks;
   at least one said spaceblock having a radially-extending duct defined therein, said duct extending between an inlet opening and an outlet opening; and
   wherein said outlet opening is disposed in a surface of said at least one spaceblock facing a cavity adjacent thereto, said outlet opening being defined in a mid-section of said spaceblock so as to emit said cooling gas flow generally in a direction of a central region of said cavity, wherein there are a plurality of outlet openings, at least one said outlet opening emitting said cooling gas flow generally in a direction of a central region of said cavity, wherein said outlet openings are defined in at least first and second surfaces of said at least one spaceblock, and wherein a partition member is disposed in said duct for defining first and second passage portions.

9. A gas cooled dynamoelectric machine, comprising:
a rotor having a spindle and a body portion;
a rotor winding comprising axially extending coils disposed on said body portion and spaced, concentric endwindings extending axially beyond at least one end of said body portion, said endwindings and said spindle defining a space therebetween;
a plurality of spaceblocks located between adjacent ones of said endwindings, at least one of said spaceblocks having an internal duct, including an inlet opening and an outlet opening, extending from said space between said endwindings and said spindle to a cavity located between respective endwindings;
said inlet opening being formed on a circumferentially oriented surface of said at least one spaceblock; and
said duct outlet opening being disposed in said spaceblock so as to emit said cooling gas flow in a direction of a central region of said cavity.

10. The dynamoelectric machine of claim 9, wherein a plurality of said spaceblocks have an internal duct formed therein.

11. The dynamoelectric machine of claim 9, wherein there are a plurality of outlet openings, at least one said outlet opening emitting said cooling gas flow generally in a direction of a central region of said cavity.

12. The dynamoelectric machine of claim 11, wherein said outlet openings are defined in a common surface of said at least one spaceblock.

13. The dynamoelectric machine of claim 11, wherein said outlet openings are defined in at least first and second surfaces of said at least one spaceblock.

14. The dynamoelectric machine of claim 11, further comprising a retaining ring disposed around said endwindings, and wherein said internal duct extends from a point radially inward of said endwindings to a point near said retaining ring.

15. A gas cooled dynamoelectric machine comprising:
a rotor having a spindle and a body portion;
a rotor winding comprising axially extending coils disposed on said body portion and spaced, concentric endwindings extending axially beyond at least one end of said body portion, said endwindings and said spindle defining a space therebetween;
a plurality of spaceblocks located between adjacent ones of said endwindings, at least one of said spaceblocks having an internal duct, including an inlet opening and an outlet opening, extending from said space between said endwindings and said spindle to a cavity located between respective endwindings; and
said duct outlet opening being disposed in said spaceblock so as to emit said cooling gas flow in a direction of a central region of said cavity, wherein there are a plurality of outlet openings, at least one said outlet opening emitting said cooling gas flow generally in a direction of a central region of said cavity, and wherein at least one said outlet opening is directed at an angle of less than 90 degrees with respect to an axis of said rotor so as to impinge cooling gas on an endwinding adjacent thereto.

16. A method of cooling endwindings in a dynamoelectric machine comprising a rotor having a body portion, axially extending coils and endwindings extending axially beyond at least one end of said body portion; a plurality of spaceblocks disposed between said endwindings; and a plurality of cavities being defined between mutually adjacent endwindings and spaceblocks; the method comprising:

providing at least one said spaceblock having a radially-extending duct defined therein, said duct extending between an inlet opening and an outlet opening, said inlet opening being disposed in a surface of said at least one spaceblock facing a cavity defined adjacent thereto, said outlet opening being disposed in a surface of said at least one spaceblock facing a cavity adjacent thereto, said outlet opening being defined in a mid-section of said spaceblock; and rotating said rotor so that a pressure head drives a cooling gas through said inlet opening into said radially-extending duct and through said outlet opening into a respective cavity, so as to emit said cooling gas flow generally in a direction of a central region of said cavity.

17. A method as in claim 16, wherein there are a plurality of outlet openings whereby cooling gas is directed into cavities on each side of said at least one spaceblock.

18. A method as in claim 16, wherein there are a plurality of outlet openings whereby cooling gas is directed in radially outer, radially inner, and central regions of said cavity.

19. A method of cooling endwindings in a dynamoelectric machine comprising a rotor having a body portion, axially extending coils and endwindings extending axially beyond at least one end of said body portion; a plurality of spaceblocks disposed between said endwindings; and a plurality of cavities being defined between mutually adjacent endwindings and spaceblocks; the method comprising:

providing at least one said spaceblock having a radially-extending duct defined therein, said duct extending between an inlet opening and an outlet opening, said outlet opening being disposed in a surface of said at least one spaceblock facing a cavity adjacent thereto, said outlet opening being defined in a mid-section of said spaceblock; and rotating said rotor so that a pressure head drives a cooling gas through said inlet opening into said radially-extending duct and through said outlet opening into a respective cavity, so as to emit said cooling gas flow generally in a direction of a central region of said cavity, wherein there are a plurality of outlet openings, at least one said outlet opening being directed at an angle of less than 90 degrees with respect to an axis of said rotor so as to impinge cooling gas on an endwinding adjacent thereto.

* * * * *